United States Patent

Iraji et al.

(10) Patent No.: US 9,497,003 B2
(45) Date of Patent: Nov. 15, 2016

(54) COMMON REFERENCE SIGNAL CONFIGURATION FOR CARRIER AGGREGATION

(71) Applicant: Nokia Technologies Oy, Espoo (FI)

(72) Inventors: Sassan Iraji, Espoo (FI); Juha Korhonen, Espoo (FI);
(Continued)

(73) Assignee: NOKIA TECHNOLOGIES OY, Espoo (FI)

( * ) Notice: Subject to any disclaimer, the term of this patent is extended or adjusted under 35 U.S.C. 154(b) by 12 days.

(21) Appl. No.: 14/381,775

(22) PCT Filed: Jan. 24, 2013

(86) PCT No.: PCT/FI2013/050074
§ 371 (c)(1),
(2) Date: Aug. 28, 2014

(87) PCT Pub. No.: WO2013/135944
PCT Pub. Date: Sep. 19, 2013

(65) Prior Publication Data
US 2015/0023197 A1    Jan. 22, 2015

Related U.S. Application Data

(60) Provisional application No. 61/611,772, filed on Mar. 16, 2012.

(51) Int. Cl.
*H04L 5/00* (2006.01)
*H04W 48/16* (2009.01)
(Continued)

(52) U.S. Cl.
CPC ............... *H04L 5/005* (2013.01); *H04L 5/001* (2013.01); *H04L 5/0092* (2013.01);
(Continued)

(58) Field of Classification Search
USPC ........................................................ 370/252
See application file for complete search history.

(56) References Cited

U.S. PATENT DOCUMENTS

2009/0010312 A1* 1/2009 Han .................... H04B 1/70735
375/145
2009/0268669 A1  10/2009 Ko et al.
(Continued)

OTHER PUBLICATIONS

"Further Details on Synchronization on Additional Carrier Types", 3GPP TSG RAN WG1 Meeting #67, R1-113676, Agenda Item : 7.2.2, Nov. 14-18, 2011, pp. 1-4.
(Continued)

*Primary Examiner* — Andrew Lai
*Assistant Examiner* — Jamaal Henson
(74) *Attorney, Agent, or Firm* — Squire Patton Boggs (US) LLP

(57) ABSTRACT

Eliminating or reducing transmission of common signals for enhanced spectral efficiency, improved support for heterogeneous networks, network energy saving possibilities, can be obtained by apparatuses and methods according to certain embodiments. A method for operating a user equipment can include receiving a measurement object from a network for detection of one or more predetermined type cells. A cell search can be conducted. When a predetermined type cell is found, cell specific reference signal hopping parameters can be determined. Then, radio resource management measurement can be performed from the cell specific reference signal hopping parameters.

17 Claims, 8 Drawing Sheets

(72) Inventors: Esa Malkamaki, Espoo (FI);
Panayiotis Papadimitriou, Espoo (FI);
Antti Sorri, Helsinki (FI)

(51) Int. Cl.
*H04W 36/00* (2009.01)
*H04W 36/30* (2009.01)

(52) U.S. Cl.
CPC ..... *H04W 36/0061* (2013.01); *H04W 36/0072* (2013.01); *H04W 36/30* (2013.01); *H04W 48/16* (2013.01); *H04L 5/0023* (2013.01); *H04L 5/0082* (2013.01); *Y02B 60/50* (2013.01)

(56) References Cited

U.S. PATENT DOCUMENTS

| | | | |
|---|---|---|---|
| 2010/0195748 A1 | 8/2010 | Nam et al. | |
| 2011/0090817 A1* | 4/2011 | Qu | H04L 5/001 370/254 |
| 2011/0159901 A1* | 6/2011 | Frenger | H04L 5/0082 455/502 |
| 2011/0235682 A1 | 9/2011 | He et al. | |
| 2011/0286423 A1 | 11/2011 | Berggren et al. | |
| 2012/0044870 A1* | 2/2012 | Mochizuki | H04B 7/024 370/328 |
| 2012/0281783 A1* | 11/2012 | Cheng | H04B 7/0456 375/295 |
| 2013/0016653 A1* | 1/2013 | Kim | H04W 72/042 370/315 |
| 2013/0040640 A1* | 2/2013 | Chen | H04W 36/30 455/434 |

OTHER PUBLICATIONS

"3rd Generation Partnership Project; Technical Specification Group Radio Access Network; Evolved Universal Terrestrial Radio Access (E-UTRA); Physical layer procedures(Release 10)", 3GPP TS 36.213, V10.4.0, Dec. 2011, pp. 1-125.

Extended European Search Report received for corresponding European Patent Application No. 13760354.4, dated Oct. 8, 2015, 7 pages.

Dahlman et al., "Downlink Physical-Layer Processing", 4G LTE/LTE-Advanced for Mobile Broadband, 2011, pp. 143-202.

International Search Report and Written Opinion received for corresponding Patent Cooperation Treaty Application No. PCT/FI2013/050074, dated May 6, 2013, 11 pages.

Hoymann et al., "A Lean Carrier for LTE" LTE Technology Update: Part 2, IEEE Communications Magazine, IEEE Service Center, Piscataway, US, 7 pages.

* cited by examiner

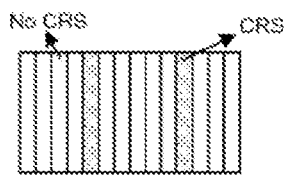
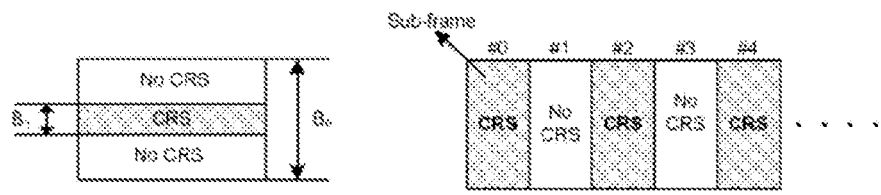
Fig. 2A          Fig. 2B
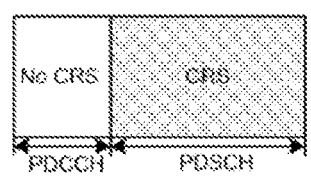
Fig. 2C          Fig. 2D
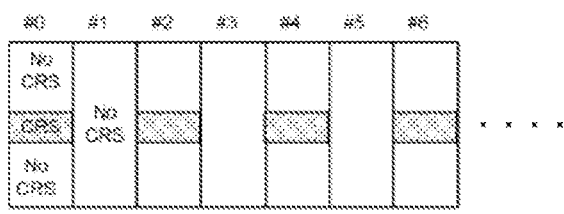
Fig. 3

COMMON REFERENCE SIGNAL CONFIGURATION FOR CARRIER AGGREGATION

RELATED APPLICATION

This application was originally filed as Patent Cooperation Treaty Application No. PCT/FI2013/050074 filed Jan. 24, 2013,which claims priority benefit to U.S. Provisional Patent Application No. 61/611,772,filed Mar. 16, 2012.

BACKGROUND

Field

Certain embodiments may broadly apply to communication system, such as communication systems associated with the long term evolution (LTE) of the third generation partnership project (3GPP). Certain embodiments more particularly may be relevant to eliminating or reducing transmission of common signals for enhanced spectral efficiency, improved support for heterogeneous networks, network energy saving possibilities, and the like.

Description of the Related Art

In wireless communication systems, downlink reference signals are normally created to provide reference for time and frequency synchronization and channel estimation used in coherent demodulation as well as a reference for a channel quality measurement used in multi-user scheduling and for handover decisions. In the LTE Release 8 (Rel-8) specification, one single type of downlink reference format called a cell-specific reference signal (CRS) is defined for synchronization, channel estimation and channel quality measurement. The characteristics of Rel-8 CRS include that, regardless of multiple input, multiple output (MIMO) channel rank that a user equipment (UE) actually needs, the base station can always broadcast the CRS to all UEs based on the largest number of MIMO layers/ports.

SUMMARY

According to a first embodiment, a method includes receiving a measurement object for detection of one or more predetermined type cells. The method also includes conducting a cell search. The method further includes, when a predetermined type cell is found, determining cell specific reference signal hopping parameters from the network. The method also includes performing radio resource management measurement from the cell specific reference signal hopping parameters.

According to a second embodiment, an apparatus includes at least one processor and at least one memory including computer program code. The at least one memory and the computer program code are configured to, with the at least one processor, cause the apparatus at least to receive a measurement object for detection of one or more predetermined type cells. The at least one memory and the computer program code are also configured to, with the at least one processor, cause the apparatus at least to conduct a cell search. The at least one memory and the computer program code are further configured to, with the at least one processor, cause the apparatus at least to, when a predetermined type cell is found, determine cell specific reference signal hopping parameters from the network. The at least one memory and the computer program code are additionally configured to, with the at least one processor, cause the apparatus at least to perform radio resource management measurement from the cell specific reference signal hopping parameters.

According to a third embodiment, an apparatus includes means for receiving a measurement object for detection of one or more predetermined type cells. The apparatus also includes means for conducting a cell search. The apparatus further includes means for, when a predetermined type cell is found, determining cell specific reference signal hopping parameters from the network. The apparatus also includes means for performing radio resource management measurement from the cell specific reference signal hopping parameters.

According to a fourth embodiment, a method includes providing a measurement object to a user equipment for detection of one or more predetermined type cells, which causes the user equipment at least to conduct a cell search. The method also includes providing cell specific reference signal hopping parameters to the user equipment, which causes the user equipment performs radio resource management measurement from the cell specific reference signal hopping parameters.

According to a fifth embodiment, an apparatus includes at least one processor and at least one memory including computer program code. The at least one memory and the computer program code are configured to, with the at least one processor, cause the apparatus at least to provide a measurement object to a user equipment for detection of one or more predetermined type cells, which causes the user equipment at least to conduct a cell search. The at least one memory and the computer program code are also configured to, with the at least one processor, cause the apparatus at least to send cell specific reference signal hopping parameters to the user equipment, which causes the user equipment at least to perform radio resource management measurement from the cell specific reference signal hopping parameters.

According to a sixth embodiment, an apparatus includes means for providing a measurement object to a user equipment for detection of one or more predetermined type cells, causing the user equipment to conduct a cell search. The apparatus also includes means for sending cell specific reference signal hopping parameters to the user equipment, which causes the user equipment to perform radio resource management measurement from the cell specific reference signal hopping parameters.

According to seventh and eighth embodiments, a non-transitory computer readable medium is encoded with instructions that, when executed in hardware, perform a process, the process respectively comprising the method of the first and fourth embodiments.

According to a ninth embodiment, a system can include a first apparatus and a second apparatus. The first apparatus can include means for receiving a measurement object for detection of one or more predetermined type cells, means for conducting a cell search, means for, when a predetermined type cell is found, determining cell specific reference signal hopping parameters from the network, and means for performing radio resource management measurement from the cell specific reference signal hopping parameters. The second apparatus can include means for providing the measurement object to the first apparatus; and means for sending the cell specific reference signal hopping parameters to the first apparatus.

BRIEF DESCRIPTION OF THE DRAWINGS:

For proper understanding of the invention, reference should be made to the accompanying drawings, wherein:

FIG. 2A illustrates a signal structure type according to certain embodiments.

FIG. 2B illustrates another signal structure according to certain embodiments.

FIG. 2C illustrates yet another signal structure according to certain embodiments.

FIG. 2D illustrates yet another signal structure according to certain embodiments.

FIG. 3 illustrates yet another signal structure according to certain embodiments.

DETAILED DESCRIPTION

A new carrier type has been planned to be specified for LTE Rel-11, which can provide enhanced spectral efficiency, improved support for heterogeneous networks, network energy saving possibilities, and the like. To reach these targets, it may be necessary to eliminate or reduce transmission of common signals, such as, for example, primary synchronization signal/secondary synchronization signal (PSS/SSS), cell specific reference signal (CRS), physical downlink shared channel (PDSCH), physical downlink control channel (PDCCH), and the like. For the LTE Rel-11 operation, the new carrier type may be always associated with a LTE Rel-8, LTE Rel-9 or LTE Rel-10 carrier. The cells can be respectively referred to as a new type cell and a Rel-8/9/10 backward-compatible cell hereinafter.

Figure 1:
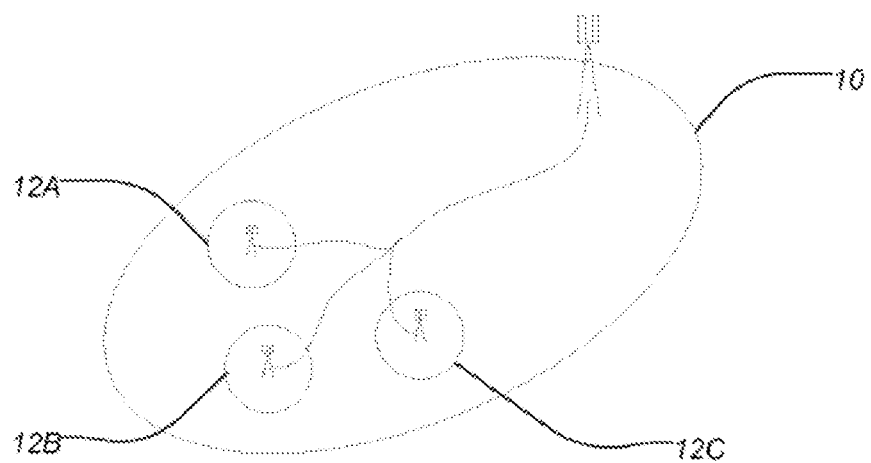
FIG. 1 illustrates a macro cell with three femto cells formed by remote radio heads.

The design of the new type cell can support operation in two scenarios: (i) synchronized carriers, for example when the legacy and new type cells are synchronized in time and frequency to the extent that no separate synchronization processing is needed in the receiver, and (ii) unsynchronized carriers for example, when the legacy and new type cells are not synchronized with the same degree of accuracy as for the synchronized carriers, which is shown in FIG. 1. FIG. 1 shows a macro cell 10 with three femto cells 12A, 12B and 12C formed by remote radio heads. The macro cell 10 typically may not be able to indicate to a UE the accurate timing of the carriers of the remote radio heads because of the signal propagation delays.

With the synchronized cells, the associated legacy cell with the new type cells may serve as an accurate time and frequency reference, and as far as the time and frequency synchronization is concerned, PSS/SSS and CRS can be dropped. With the unsynchronized cells, an upper limit for the frequency offset between the cells may be determined by the base station frequency stability requirements, and frequency acquisition may not be a concern but only a tracking system may be needed. However, to obtain the timing for the new type cell, both timing acquisition and tracking may be needed. For instance, if the new type cell is provided with a remote radio head (RRH), the network may not be able to provide an initial timing value, but the UE may be able to cope with a timing difference of up to about 30 μsec, as it is also the case with backward compatible macro and RRH cells. With the unsynchronized cells, the network may not necessarily know that the UE is in the coverage of the new type cell, which may mean that cell search with measurements and reporting should be possible for the new type cells.

Certain embodiments address the scenario of unsynchronized carriers, based on an assumption that common signals, for example, PSS/SSS, CRS, and the like, are needed for cell detection, timing acquisition and maintenance, and so forth, but the common signals may be limited to only a part of a carrier. Assuming that common signals are needed at a new type cell, the common signals may need to be designed for spectral efficiency and efficient interference management. The design may also need to preserve as much as possible from the present synchronization system in order to minimize UE implementation changes. CRS may also be needed for demodulation, frequency and time tracking, and radio resource management (RRM) measurements. However, using CRS as it is in the LTE Rel-8/9/10 specification may mean huge overhead. Removal or reduction of the CRS may decrease the overhead. The channel state information reference signal (CSI-RS) defined in the Rel-10 specification may not be enough for time/frequency tracking. Therefore, a new set of reference signals may be needed.

In certain embodiments, the CRS overhead in a new carrier type may be reduced by using only six resource blocks (RBs) of a new type cells center frequency to send CRS. For example, when the new type cell has fifty RBs (i.e., $B_0$=50), only the center six RBs may be used to carry CRS (i.e., $B_1$=6), as shown in FIG. 2A. Alternatively, the system may be configured to send CRS every 2 ms, 3 ms, 4 ms, or the like, for example, when the send period is 2 ms, CRS may occur in the sub-frame #0, #2, #4, #6 and #8, as shown in FIG. 2B. In another embodiment, CRS may be configured only in one or two orthogonal frequency-division multiplexing (OFDM) symbols of every sub-frame, as shown in FIG. 2C. In yet another embodiment, CRS may exist only in a domain of physical downlink shared channel (PDSCH) in a sub-frame, as shown in FIG. 2D. These methods may be used independently or used in combination. For example, the methods shown in FIGS. 2A and 2B may be used together, as shown in FIG. 3, or the method shown in FIGS. 2B and 2D may be used together.

Figure 4A:
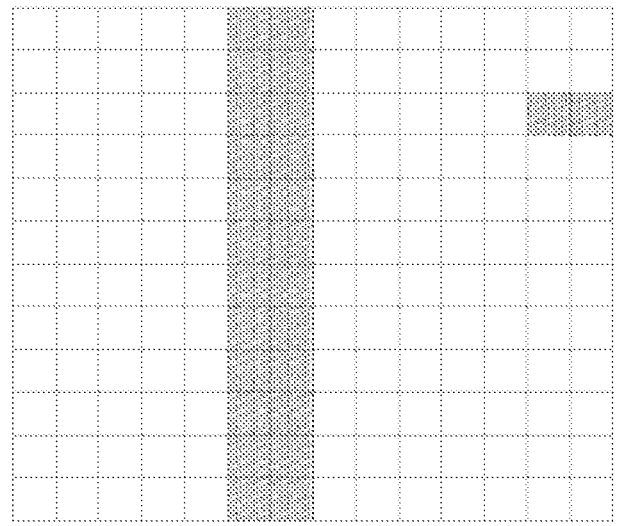
FIG. 4A illustrates a common signal configuration according to certain embodiments.
Figure 4B:
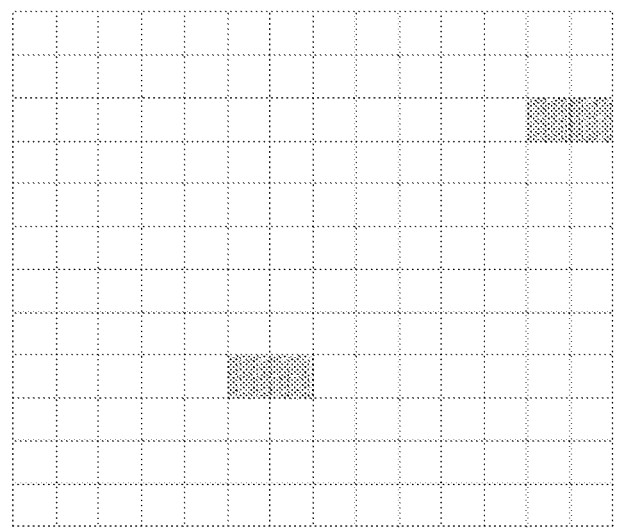
FIG. 4B illustrates another common signal configuration according to certain embodiments.

In another embodiment, the CRS overhead in a new cell type may be reduced by basing frequency/time tracking on CSI-RS. For example, FIG. 4B shows a dual CSI-RS pattern, in which a two symbols by two frequency pins wide CSI-RS signal is added to each physical resource block (PRB), thereby doubling the CSI-RS resources of the LTE Rel-10 system. The common signal configuration shown in FIG. 4B may improve the timing/frequency tracking compared to the synchronization based on PSS/SSS and CSI-RS, as shown in FIG. 4A.

Figure 5:
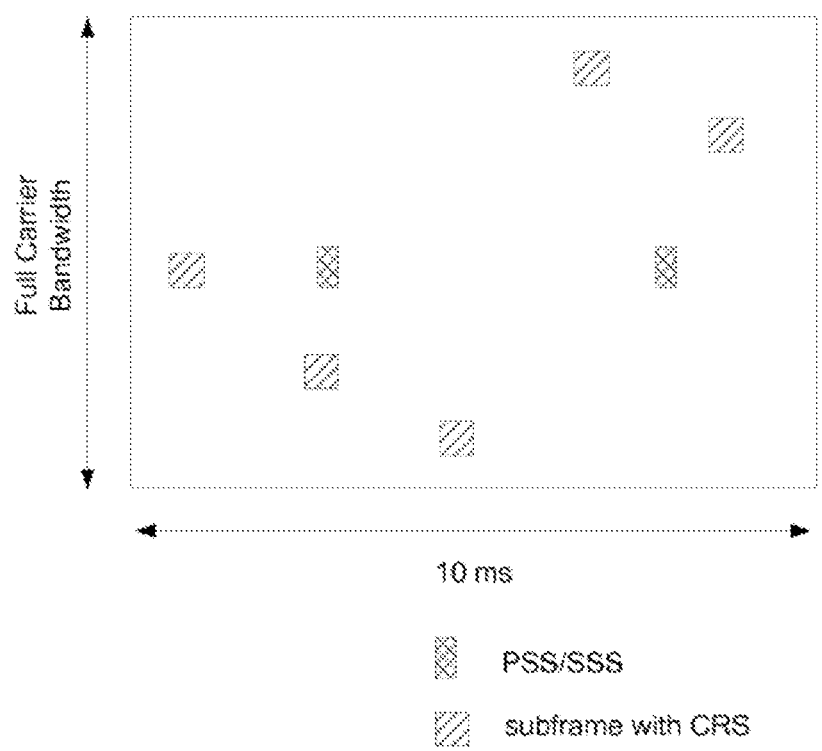
FIG. 5 illustrates a frequency hopping CRS configuration for a new carrier type according to certain embodiments.

In yet another embodiment, a sparse frequency hopped CRS-based reference signal configured via a primary cell (PCell) may be introduced for time/frequency tracking. For example, a number of CRSs may occupy a limited number of RBs and symbols and hop along the bandwidth, which is referred to as frequency-hopped CRS. The width or length of CRS may be adjustable based on the needs or requirements. In an embodiment, several hopping patterns may be made available for assigning to different cells such that overlapping of sub-frames with CRS may be avoided in the neighbor cells. An example of the frequency-hopped CRS scheme is shown in FIG. 5.

The frequency hopping mechanism may enable the signaling schemes to efficiently communicate the hopping patterns to UE. For example, signaling may be handled completely through the radio resource control (RRC), which is referred to as RRC signaling. Then the discovery would consist of two steps. In the first step UE would find PSS/SSS signals of a new type cell and in the second step, after receiving from the network some information on hopping pattern of the new type cell, UE would synchronize accurately utilizing CRS. In the RRC signaling, a stepped cell discovery procedure may be the most efficient and distinctive from the existing cell search and discovery procedures. So this RRC signaling is specific for this scheme and it is not a generic method used in conventional approaches. Alternatively, the UE may acquire some information for finding the CRS sub-frame hopping pattern of the cell from the detected physical cell identity (PCI), which may be a combination of PSS and SSS.

In implementing the frequency-hopped CRS scheme, there may be a number of parameters that characterize the hopping pattern. The parameters may be fixed, for example, specified in the standard, or explicitly signaled. Also, at least some of the parameters may be derived implicitly from PCI. The fixed-by-standard parameters may include, for example, width of a CRS covered frequency region in a sub-frame, which may be six PRBs. The fixed-by-standard parameters may also include the number of CRS frequency pins per PRB and antenna port, which may be the same as the present setting. Also, the CRS may be transmitted from a single antenna port only. Further, the periodicity of the CRS hopping pattern may be a radio frame, which may simplify detection of CRS because the frame borders may be known after UE detects PSS and SSS of the present form. Prolonging of hopping patterns beyond a radio frame may mean signaling or determination of a system frame number or at least the least significant bit/bits (LSBs) of the system frame. In principle, the system frame number of a new type cell may be always synchronized to a frame number of a legacy cell, which may be too restrictive.

Figure 6A:
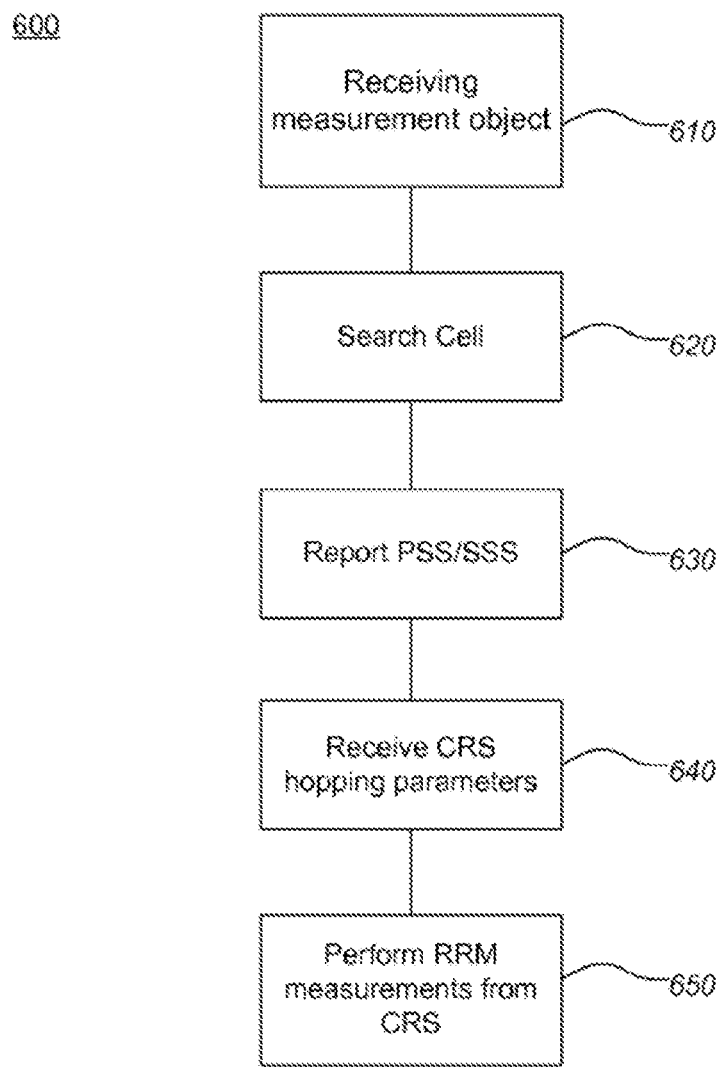
FIG. 6A illustrates UE actions in a cell discovery method according to certain embodiments.

In certain embodiments, all of the CRS hopping parameters besides the fixed-by-standard ones may be signaled by RRC. With this configuration, a synchronization process 600 may be carried out as shown in FIG. 6A. First, a measurement object may be given for UE to detect of a new type cell or cells (at 610). The measurement object content may be the frequency to measure and an indication that predetermined type cells are present on the frequency. Then, the UE may conduct a cell search (at 620). According to Rel-8/9/10 definitions, when a UE has detected PSS/SSS, it knows from where to find the CRS and can measure signal power and quality. However, UEs may not be expected to be able to measure the CRS power and quality after PSS/SSS detection in a new type cell. According to an embodiment of the invention, when a cell is found, UE may report PSS/SSS network identifier (NID), physical cell identity (PCI), or the like, to the network (at 630). In response to the report from UE, the network may indicate CRS hopping parameters, which may be received by UE (at 640). Subsequently, UE may perform radio resource management (RRM) measurements from the CRS hopping parameters (at 650).

It may not be sensible to include in the measurement object any information other than what is needed for PSS/SSS detection because the network may not necessarily know if the UE is in the coverage of a certain new type cell. Also, it may not be efficient to include such additional information on the hopping patterns to the system information broadcasted by the legacy cell because there could be a substantial number of new type cells in the coverage of the conventional cell, which may cause excessive signaling load.

Figure 6B:
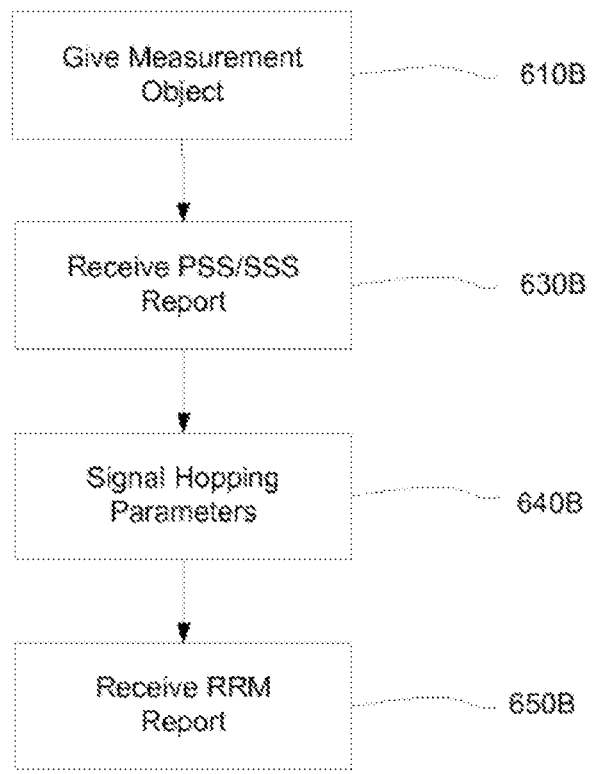
FIG. 6B illustrates network actions in a cell discovery method according to a certain embodiments.

In yet another embodiment, accordant with FIGS. 6A and 6B, a UE may obtain a hopping pattern, or a limited set of possible patterns, implicitly from the PCI of the new type cell. The implicitly obtained parameters may be a bandwidth of the new type cell and a frequency and/or time offset of the pattern. For example, the numbers of six non-overlapping PRB wide CRS regions at different bandwidths may be one (1) at 1.4 MHz, two (2) at 3 MHz, four (4) at 5 MHz, eight (8) at 10 MHz, twelve (12) at 15 MHz, and eighteen (18) at 20 MHz. Then, forty five (45) values may be needed (i.e., 1+2+4+8+12+18=45) for signaling the combination of the bandwidth and frequency offset of the hopping pattern. Since the number of different PSS/SSS combinations maintained in the legacy value is 504, signaling of 10 time offsets in addition to a sum of the 45 bandwidth and the frequency offset combinations could be possible (i.e., 10*45=450<504 values would be needed).

One example for implementing the scheme is based on following simple equation where the CRS time offset can be given by $$CRS\_time\_offset = mod_{10}(PCI),$$

where PCI is given by PCI=3*NID1+NID2 (group identity NID1=0, . . . ,167 from sequence index used for the PSS & identity NID2=0, . . . ,2 within the group is obtained from the sequence index used for the SSS), $mod_{10}(PCI)$ gives ten different alternatives for time offset which are transformed to actual CRS time offsets in sub-frames within a radio frame.

And the PRB offset can be handled with the following equation mapping from the PCI to one of the 45 frequency offset indexes $$index\_PRB\_offset = \lfloor PCI/10 \rfloor$$

wherein the operation $\lfloor x \rfloor$ rounds the variable (x) down to the next smaller integer.

The aforementioned scheme of deriving the hopping parameters from PCI may have the advantage that the PCI may be verified from the hopping CRS. If a limited set of hopping patterns is derived from the PCI, for example, if the PCI does not fully determine the hopping pattern, the UE may use blind detection to find the hopping pattern.

Therefore, according to the embodiments, the reference signal overhead may be reduced, and CRS may be reused for RRM measurements. In addition, the synchronization method 600 may allow reliable CRS based channel quality measurements over the whole bandwidth, and may further allow interference free CSR signals by planning of hopping patterns.

Figure 7:
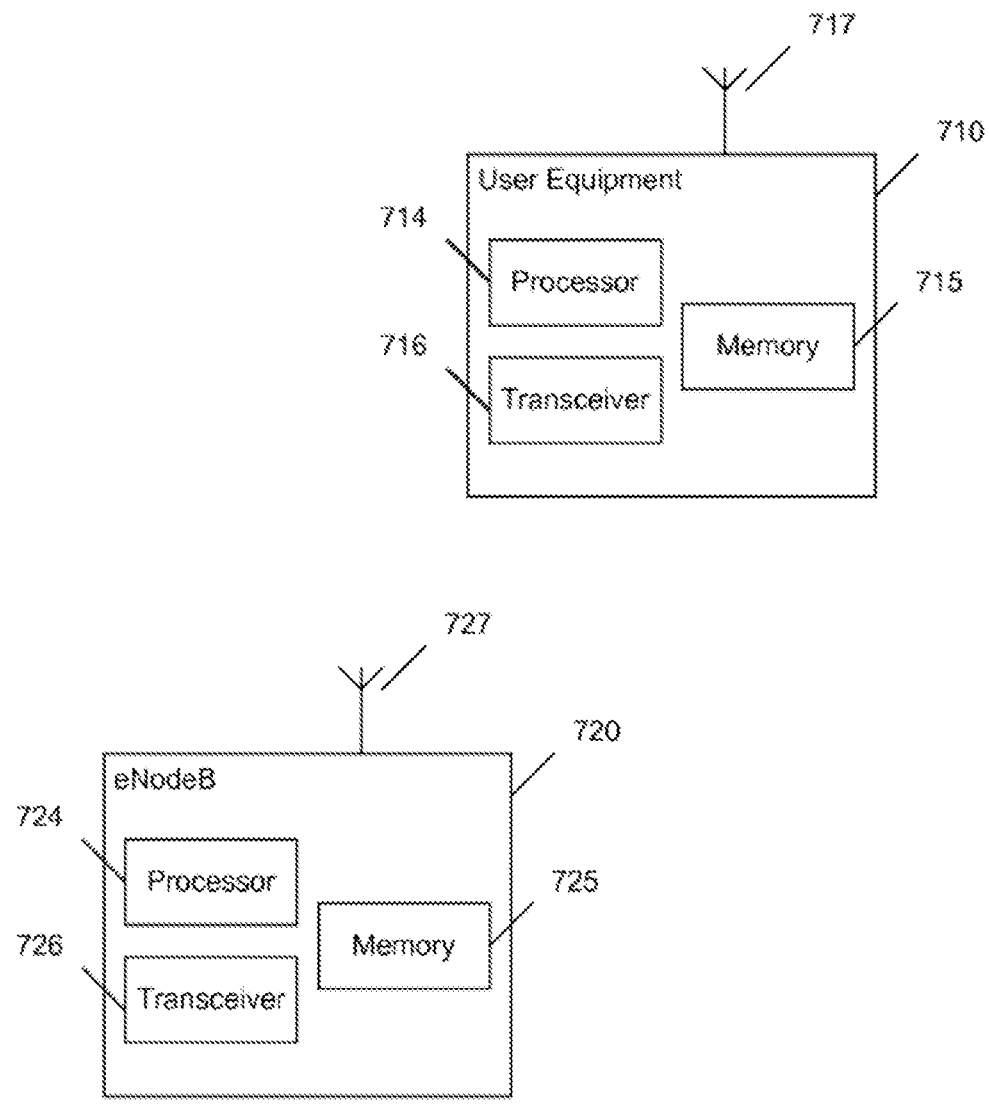
FIG. 7 illustrates a system according to certain embodiments.

FIG. 7 illustrates a system according to certain embodiments. In an example embodiment, a system may include two devices, UE 710 and eNodeB 720. Each of the devices 710 and 720 may be equipped with at least one processor (respectively 714 and 724), at least one memory (respectively 715 and 725) (including computer program instructions or code), a transceiver (respectively 716 and 726), and at least an antenna (respectively 717 and 727). There is no requirement that each of these devices be so equipped. For example, the eNodeB 720 may be equipped for wired communication with a core network (not shown).

The transceiver (respectively 716 and 726) may be a transmitter, a receiver, both a transmitter and a receiver, or a unit that is configured both for transmission and reception. The transceiver (respectively 716 and 726) may be coupled to corresponding one or more antenna(s) (respectively 717 and 727), which may include a directional antenna.

The at least one processor (respectively 714 and 724) may be variously embodied by any computational or data processing device, such as a central processing unit (CPU) or application specific integrated circuit (ASIC). The at least one processor (respectively 714 and 724) may be implemented as one or a plurality of controllers.

The at least one memory (respectively 715 and 725) may be any suitable storage device, such as a non-transitory computer-readable medium. For example, a hard disk drive (HDD) or random access memory (RAM) may be used in the at least one memory (respectively 715 and 725). The at least one memory (respectively 715 and 725) may be on a same chip as the corresponding at least one processor (respectively 714 and 724), or may be separate from the corresponding at least one processor (respectively 714 and 724).

The computer program instructions may be any suitable form of computer program code. For example, the computer program instructions may be a compiled or interpreted computer program.

Figure 6C:
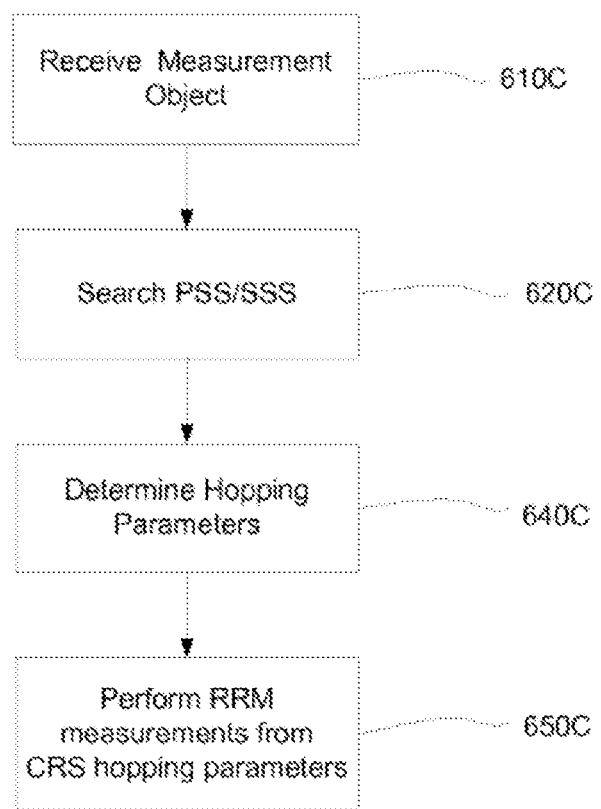
FIG. 6C illustrates a cell discovery method according to embodiments where UE is able to find CRS without signaling with network taking place after PSS/SSS detection.

The at least one memory (respectively 715 and 725) and computer program instructions may be configured to, with the at least one processor (respectively 714 and 724), cause a hardware apparatus (for example, user equipment 710 or eNodeB 720) to perform a process, such as any of the processes described herein (see, for example, FIG. 6).

Thus, in certain embodiments, a non-transitory computer-readable medium may be encoded with computer instructions that, when executed in hardware perform a process, such as one of the processes described herein. Alternatively, certain embodiments of the present invention may be performed entirely in hardware.

The devices of the system may also include additional components. For example, each of the UE 710 and eNodeB 720 may include a user interface that is operable connected to the processor (respectively 714 and 724) and memory (respectively 715 and 725). The user interface may include a display, such as a liquid crystal display (LCD) or organic electroluminescent display (OELD), as well as speakers or audio outputs. Tactile outputs, such as a haptic feedback system, can also be included. The user interface may have a touch screen to receive user input. User input can also be provided by a keypad, keyboard, microphone, joystick, mouse, trackball, or other input device. Of course, there is no requirement that the devices include a user interface. For example, the eNodeB 720 may be embodied in part as a rack-mounted computer.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus, comprising:
   at least one processor;
   and at least one memory including computer program code stored on the at least one memory, wherein the at least one memory and the computer program code are configured to, with the at least one processor, cause the apparatus to at least receive a measurement object for detection of one or more predetermined type of cells;
   conduct a cell search;
   when a predetermined type of cell is found, determine cell specific reference signal hopping parameters from a network;
   and perform radio resource management measurement from the cell specific reference signals corresponding to the cell specific reference signal hopping parameters;
   and wherein the cell specific reference signal hopping parameters are fixed by a standard and comprise a width of a cell specific reference signal covered frequency region, and a number of cell specific reference signal pins per physical resource block and antenna.

2. The apparatus of claim 1, wherein the at least one memory and the computer program code are configured to, with the at least one processor, cause the apparatus to at least at least partly determine the cell specific reference signal hopping parameters from one or more of a primary synchronization sequence, a secondary synchronization sequence, or a physical cell id.

3. The apparatus of claim 1, wherein the at least one memory and the computer program code are configured to, with the at least one processor, cause the apparatus to at least determine the cell specific reference signal hopping parameters by reporting for the predetermined type of cell at least one of a primary synchronization signal, a secondary synchronization signal, or a physical cell identity to the network;
   and receiving information for at least one cell specific reference signal hopping parameter from the network.

4. The apparatus of claim 1, wherein the at least one memory and the computer program code are configured to, with the at least one processor, cause the apparatus at least to determine the cell specific reference signal hopping parameters by mapping the cell specific reference signal hopping parameters from at least one synchronization signal.

5. The apparatus of claim 1, wherein in performing the radio resource management measurement the cell specific reference signal is transmitted via a single antenna port only.

6. The apparatus of claim 1, wherein the periodicity of a cell specific reference signal hopping pattern is a radio frame.

7. The apparatus of claim 1, wherein the measurement object comprises a frequency to measure and an indication that predetermined type cells are present on the frequency.

8. The apparatus of claim 1, wherein the predetermined type cell comprises a new carrier type cell.

9. An apparatus, comprising:
   at least one processor;
   and at least one memory including computer program code stored on the at least one memory, wherein the at least one memory and the computer program code are configured to, with the at least one processor, cause the apparatus to at least provide a measurement object to a user equipment for detection of one or more predetermined type of cells, which causes the user equipment to at least conduct a cell search;
   and send cell specific reference signal hopping parameters to the user equipment, which causes the user equipment to at least perform radio resource management measurement from cell specific reference signals corresponding to the cell specific reference signal hopping parameters, wherein the cell specific reference signal hopping parameters are fixed by a standard and comprise a width of a cell specific reference signal covered frequency region, and a number of cell specific reference signal pins per physical resource block and antenna.

10. The apparatus of claim 9, wherein the at least one memory and the computer program code are further configured to, with the at least one processor, cause the apparatus to at least signal the cell specific reference signal hopping parameters by radio resource control.

11. The apparatus of claim 9, wherein performing the radio resource management comprises transmitting the cell specific reference signal via a single antenna port only.

12. The apparatus of claim 9, wherein a periodicity of the cell specific reference signal hopping pattern is a radio frame.

13. The apparatus of dam 9, wherein the measurement object comprises a frequency to measure and an indication that the predetermined type of cells are present on the frequency.

14. The apparatus of claim 9, wherein the predetermined type cell comprises a new carrier type of cell.

15. An apparatus, comprising:
   at least one processor;
   and at least one memory including computer program code stored on the at least one memory, wherein the at least one memory and the computer program code are configured to, with the at least one processor, cause the apparatus to at least provide a measurement object to a user equipment for detection of one or more predetermined type of cells, which causes the user equipment to at least conduct a cell search;
   and send cell specific reference signal hopping parameters to the user equipment, which causes the user equipment to at least perform radio resource management measurement from cell specific reference signals corresponding to the cell specific reference signal hopping parameters wherein the cell specific reference signal hopping parameters are fixed by a standard and are not signaled by radio resource control.

16. A method, comprising:
   receiving a measurement object for detection of one or more predetermined type of cells;
   conducting a cell search;
   when a predetermined type of cell is found, determining cell specific reference signal hopping parameters from a network;
   and performing radio resource management measurement from cell specific reference signals corresponding to the cell specific reference signal hopping parameters;
   and wherein the cell specific reference signal hopping parameters which are fixed by a standard and comprise a width of a cell specific reference signal covered frequency region, and a number of cell specific reference signal pins per physical resource block and antenna.

17. A non-transitory computer readable medium encoded with instructions that, when executed in hardware, perform a process, the process comprising the method of claim 16.

* * * * *

UNITED STATES PATENT AND TRADEMARK OFFICE
CERTIFICATE OF CORRECTION

PATENT NO. : 9,497,003 B2  Page 1 of 1
APPLICATION NO. : 14/381775
DATED : November 15, 2016
INVENTOR(S) : Sassan Iraji et al.

It is certified that error appears in the above-identified patent and that said Letters Patent is hereby corrected as shown below:

In the Claims

Claim 1, Column 8, Line 12:
Please change "from the cell specific reference signals corresponding" to
--from cell specific reference signals corresponding--

Signed and Sealed this
Tenth Day of January, 2017

Michelle K. Lee
*Director of the United States Patent and Trademark Office*